(12) United States Patent
Suneja et al.

(10) Patent No.: US 11,659,003 B2
(45) Date of Patent: May 23, 2023

(54) SAFE SHELL CONTAINER FACILITATING INSPECTION OF A VIRTUAL CONTAINER

(71) Applicant: International Business Machines Corporation, Armonk, NY (US)

(72) Inventors: Sahil Suneja, Yorktown Heights, NY (US); Canturk Isci, Ridgewood, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 347 days.

(21) Appl. No.: 16/117,990

(22) Filed: Aug. 30, 2018

(65) Prior Publication Data

US 2020/0076854 A1    Mar. 5, 2020

(51) Int. Cl.
 *G06F 9/455*    (2018.01)
 *H04L 9/40*    (2022.01)

(52) U.S. Cl.
 CPC .............. *H04L 63/20* (2013.01); *G06F 9/455* (2013.01)

(58) Field of Classification Search
 CPC ................................ H04L 63/20; G06F 9/455
 See application file for complete search history.

(56) References Cited

U.S. PATENT DOCUMENTS

| | | | |
|---|---|---|---|
| 8,479,256 B2 | 7/2013 | van Riel et al. | |
| 9,323,927 B2 | 4/2016 | Lee et al. | |
| 9,912,642 B1 | 3/2018 | Edit | |
| 10,922,386 B1* | 2/2021 | Li | G06F 21/53 |
| 2011/0296429 A1 | 12/2011 | Segmuller et al. | |
| 2014/0115580 A1 | 4/2014 | Kellerman et al. | |
| 2015/0095759 A1 | 4/2015 | Olenick et al. | |
| 2017/0103206 A1 | 4/2017 | Ma et al. | |
| 2017/0147825 A1 | 5/2017 | Barton et al. | |
| 2018/0173502 A1* | 6/2018 | Biskup | G06F 21/56 |

(Continued)

FOREIGN PATENT DOCUMENTS

| | | |
|---|---|---|
| JP | 2017111761 A | 6/2017 |
| WO | 2007074565 A1 | 7/2007 |

OTHER PUBLICATIONS

International Search Report and Written Opinion received for PCT Application Serial No. PCT/IB2019/056855 dated Dec. 4, 2019, 10 pages.

(Continued)

*Primary Examiner* — Trang T Doan
*Assistant Examiner* — Vladimir I Gavrilenko
(74) *Attorney, Agent, or Firm* — Amin, Turocy & Watson, LLP

(57) ABSTRACT

Systems, computer-implemented methods, and computer program products that facilitate container inspection components of a container-based virtualization environment are provided. According to an embodiment, a system can comprise a memory that stores computer executable components and a processor that executes the computer executable components stored in the memory. The computer executable components can comprise a container inspection control component that can define one or more constrained capabilities of a container inspection. The computer executable components can further comprise a container inspection component that can inspect a virtual container based on the one or more constrained capabilities.

25 Claims, 12 Drawing Sheets

(56) References Cited

U.S. PATENT DOCUMENTS

| | | | | |
|---|---|---|---|---|
| 2018/0246646 | A1* | 8/2018 | Kärkkäinen | G06F 3/0638 |
| 2019/0265982 | A1* | 8/2019 | Mickelsson | G06F 9/44505 |
| 2019/0310872 | A1* | 10/2019 | Griffin | G06F 8/71 |
| 2019/0347127 | A1* | 11/2019 | Coady | G06F 8/63 |
| 2019/0394219 | A1* | 12/2019 | Huang | H04L 43/028 |

OTHER PUBLICATIONS

Larochelle, et al.. Statically Detecting Likely Buffer Overflow Vulnerabilities, 2001, 13 Pages.
Deline, et al., Enforcing high-level protocols in low-level software, ACM SIGPLAN Notices, 2001, 11 Pages.
Engler, et al., Checking system rules using system-specific, programmer-written compiler extensions, 2000, 16 Pages.
Viega, et al., ITS4: A static vulnerability scanner for C and C++ code, 2000, 15 Pages.
Fu, et al., Space Traveling across VM: Automatically Bridging the Semantic Gap in Virtual Machine Introspection via Online Kernel Data Redirection, IEEE Symposium on Security and Privacy, 2012, 15 Pages.
Fu, et al., Exterior: Using Dual-VM Based External Shell for Guest-OS Introspection, Configuration, and Recovery, Proceedings of the 9th ACM SIGPLAN/SIGOPS International Conference on Virtual Execution Environments, Mar. 17, 2013 pp. 97-110.
Saberi, et al., Hybrid-Bridge: Efficiently Bridging the Semantic-Gap in VMI via Decoupled Execution and Training Memoization, NDSS, Feb. 26, 2014, 15 Pages.
Fu, et al., Hypershell: A Practical Hypervisor Layer Guest OS Shell for Automated in-VM Management, Proceedings of USENIX ATC '14: 2014 USENIX Annual Technical Conference, Jun. 20, 2014, pp. 85-96.
Wu, et al., System Call Redirection: A Practical Approach to Meeting Real-World Virtual Machine Introspection Needs, Dependable Systems and Networks, 2014, pp. 574-585.
Petazzoni, Why You Don't Need to Run SSHD in your Docker Containers, https://blog.docker.com/2014/06/why-you-dont-need-to-run-sshd-in-docker/, Last Accessed Aug. 17, 2018.
Aqua Blog, Container Security Best Practices for Conscientious DevOps, https://blog.aquasec.com/container-security-best-practices-for-conscientious-devops, Last Accessed Aug. 17, 2018.
Tozzi, The Ultimate Guide to Container Security, Twistlock, https://www.twistlock.com/2017/07/06/ultimate-guide-container-security/, Last Accessed Aug. 17, 2018.
Mel, et al., The NIST Definition of Cloud Computing, National Institute of Standards and Technology Special Publication 800-145, Sep. 2011, 7 Pages.
GB Examination Report for GB Application Serial No. GB2101618.3 dated Feb. 26, 2021, 4 pages.
Aguilera, Managed Containers for Increased Cyber-Resilience, Dec. 2017, 84 Pages.
Anonymous, Transparent Application Migration on Multi-Architecture Container Based Platform-as-a-Service Cloud, Feb. 8, 2017, 5 Pages.
Anonymous, Mechanism for Managing Container Runtime State, Dec. 3, 2015, 5 Pages.
Anonymous, Method for Containment Model Consistency within Multiple Tooling and Runtime Platforms, Mar. 29, 2012, 6 Pages.
Seaborn, Plash: tools for practical least privilege, Feb. 26, 2007, 3 Pages.
Bromium, Bromium Secure Platform, https://www.bromium.com/platform/ourtechnology.html, Last Accessed Aug. 14, 2018.
Firejail, Firejail Security Sandbox, https://firejail.wordpress.com/, Last Accessed Aug. 14, 2018.
Qubes OS, An introduction to Qubes OS, https://www.qubes-os.org/intro/, Last Accessed Aug. 14, 2018.
Berrange, Libvirt Virtualization API, KVM Forum 2012; libvirt-sandbox, http://people.redhat.com/berrange/kvm-forum-2012/libvirt-sandbox-kvm-forum-2012.pdf, Last Accessed Aug. 14, 2018.
Ayer, KVMSandbox: Application-Level Sandboxing with x86 Hardware Virtualization and KVM; 2012, 16 Pages.
Madhavapeddy, et al., Unikernels: Library operating systems for the cloud, ASPLOS, Mar. 20, 2013, 12 Pages.
Kiriansky, Secure Execution Via Program Shepherding, The Proceedings of the 11th USENIX Security Symposium (Security '02), Aug. 2002, 16 Pages.
Li, et al., Lock-in-Pop: Securing Privileged Operating System Kernels by Keeping on the Beaten Path, The Proceedings of the 2017 USENIX Annual Technical Conference (USENIX ATC '17), Jul. 14, 2017, 15 Pages.
Carbone, Secure and Robust Monitoring of Virtual Machines Through Guest-assisted Introspection, International Symposium on Research in Attacks, Intrusions and Defenses (RAID '12), 2012, pp. 22-41.
Vogl, et al., X-TIER: Kernel Module Injection,NSS, 2013, pp. 192-205.
Erlingsson, et al., SASI Enforcement of Security Policies: A Retrospective, Apr. 2, 1999, 17 Pages.
McKellar, Building and breaking a Python sandbox, Feb. 22, 2014, 82 Pages.
Cappos, Retaining sandbox containment despite bugs in privileged memory-safe code, Oct. 8, 2010, 12 Pages.
Google Cloud Platform, Python Runtime Environment, https://cloud.google.com/appengine/docs/standard/python/runtime, Last Accessed Aug. 14, 2018.
Cannon, Controlling Access to Resources Within The Python Interpreter, Proceedings of the Second EECE 512 Mini-Conference on Computer Security, Apr. 12, 2007, 11 Pages.
Wallach, Extensible security architectures for Java, 16th Symposium on Operating Systems Principles, Oct. 1997, 26 Pages.
Mettler, et al., Joe-E: A Security-Oriented Subset of Java, 2010, 18 Pages.
Maffeis, et al., An operational semantics for JavaScript, 2008, Asian Symposium on Programming Languages and Systems, 18 Pages.
Adsafe, Making JavaScript safe for advertising, http://www.adsafe.org/, Last Accessed Aug. 14, 2018, 5 Pages.
Miller, et al., Caja Safe active content in sanitized JavaScript, 2008, 26 Pages.
Stinner, et al., Pysandbox, https://github.com/vstinner/pysandbox, Last Accessed Aug. 15, 2018, 5 Pages.
Gu, et al., Process Implanting: A New Active Introspection Framework for Virtualization, Reliable Distributed Systems (SRDS), 2011 30th IEEE Symposium, 2011, 10 Pages.
Wahbe, et al., Efficient Software-Based Fault Isolation, ACM SIGOPS Operating Systems Review, 1993, pp. 203-213.
Yee, et al., Native client: A sandbox for portable, untrusted x86 native code, IEEE Symposium on Security and Privacy, 2009, 15 Pages.
Ford, et al., Vx32: Lightweight User-Level Sandboxing on the x86, Sep. 26, 2008.
Garfinkel, A Delegating Architecture for Secure System Call Interposition, NDSS, 2004, 15 Pages.
Goldber, et al., A secure environment for untrusted helper applications: Confining the wily hacker, 1996, 13 Pages.
Kim, et al., Practical and Effective Sandboxing for Non-root users, USENIX Annual Technical Conference, 2013, pp. 139-144.
Provos, Improving Host Security with System Call Policies, 2003, 15 Pages.
Bernaschi et al., REMUS: A Security-Enhanced Operating System, ACM Transactions on Information and System Security, 2002, 26 Pages, vol. 5.
Jain, et al., User-Level Infrastructure for System Call Interposition: A Platform for Intrusion Detection and Confinement, 2000, 16 Pages.
Mitchem, et al., Using kernel hypervisors to secure applications, Computer Security Applications Conference, 1997, pp. 175-181.
Srinivasan, et al., Process Out-Grafting: An Efficient "Out-of-VM" Approach for Fine-Grained Process Execution Monitoring, Conference on Computer and Communications Security, Oct. 21, 2011.
Acharya, et al., MAPbox: Using parameterized behavior classes to confine untrusted applications, 2000, 18 Pages.
Chari, et al., BlueBox: A policy-driven, host-based intrusion detection system, 2003, 13 Pages.

(56) References Cited

OTHER PUBLICATIONS

Asit, et al., Chakra vyuha (cv): a sandbox operating system environment for controlled execution of alien code, 1997, 23 pages.
Ko, et al., Detecting and Countering System Intrusions Using Software Wrappers, USENIX Security Symposium, 2000, pp. 1157-1168.
Watson, et al., Capsicum: practical capabilities for UNIX, 2010, 17 Pages.
Scott, et al., Safe virtual execution using software dynamic translation, 2002, 10 Pages.
Cowan, et al., Stackguard: automatic adaptive detection and prevention of buffer-overflow attacks, Proceedings of the 7th USENIX Security Symposium, Jan. 29, 1998, 16 Pages.
Baratloo, et al., Transparent run-time defense against stack-smashing attacks, 2000, 12 Pages.
Openstack, Python AST-based static analyzer from OpenStack Security Group, https://github.com/openstack/bandit, Last Accessed Aug. 17, 2018, 1 Page.
Chiueh, et al., Surreptitious Deployment and Execution of Kernel Agents in Windows Guests, Proceedings of the 2012 12th IEEE/ACM International Symposium on Cluster, Cloud and Grid Computing, 2012, pp. 507-514.
Necula, Proof-carrying code, Proceedings of the 24th ACM SIGPLANSIGACT symposium on Principles of programming languages, Jan. 17, 1997, 14 Pages.
Evans, et al., Improving security using extensible lightweight static analysis, IEEE Software, 2002, 10 pages.
Decision to Grant a Patent dated Jan. 27, 2023 for JP Application No. 2021-507462.

\* cited by examiner

SAFE SHELL CONTAINER FACILITATING INSPECTION OF A VIRTUAL CONTAINER

BACKGROUND

The subject disclosure relates to virtual containerization systems, and more specifically, to inspection of a state of a virtual container.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate container inspection components of a container-based virtualization environment are described.

According to an embodiment, a system can comprise a memory that stores computer executable components and a processor that executes the computer executable components stored in the memory. The computer executable components can comprise a container inspection control component that can define one or more constrained capabilities of a container inspection. The computer executable components can further comprise a container inspection component that can inspect a virtual container based on the one or more constrained capabilities.

According to another embodiment, a computer-implemented method can comprise defining, by a system operatively coupled to a processor, one or more constrained capabilities of a container inspection. The computer-implemented method can further comprise inspecting, by the system, a virtual container based on the one or more constrained capabilities.

According to another embodiment, a system can comprise a memory that stores computer executable components and a processor that executes the computer executable components stored in the memory. The computer executable components can comprise a container inspection control component that can define one or more resource constraints of a container inspection. The computer executable components can further comprise a container inspection component that can inspect a virtual container based on the one or more resource constraints.

According to another embodiment, a computer program product that can facilitate a container inspection process is provided. The computer program product can comprise a computer readable storage medium having program instructions embodied therewith, the program instructions can be executable by a processing component to cause the processing component to define, by the processor, one or more resource constraint components of a container inspection. The program instructions can also cause the processing component to inspect, by the processor, a virtual container based on the one or more resource constraint components.

According to another embodiment, a system can comprise a memory that stores computer executable components and a processor that executes the computer executable components stored in the memory. The computer executable components can comprise a container inspection control component that can define one or more inspection operations of a container inspection. The computer executable components can further comprise a sidecar container component that can inspect a virtual container based on the one or more inspection operations.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
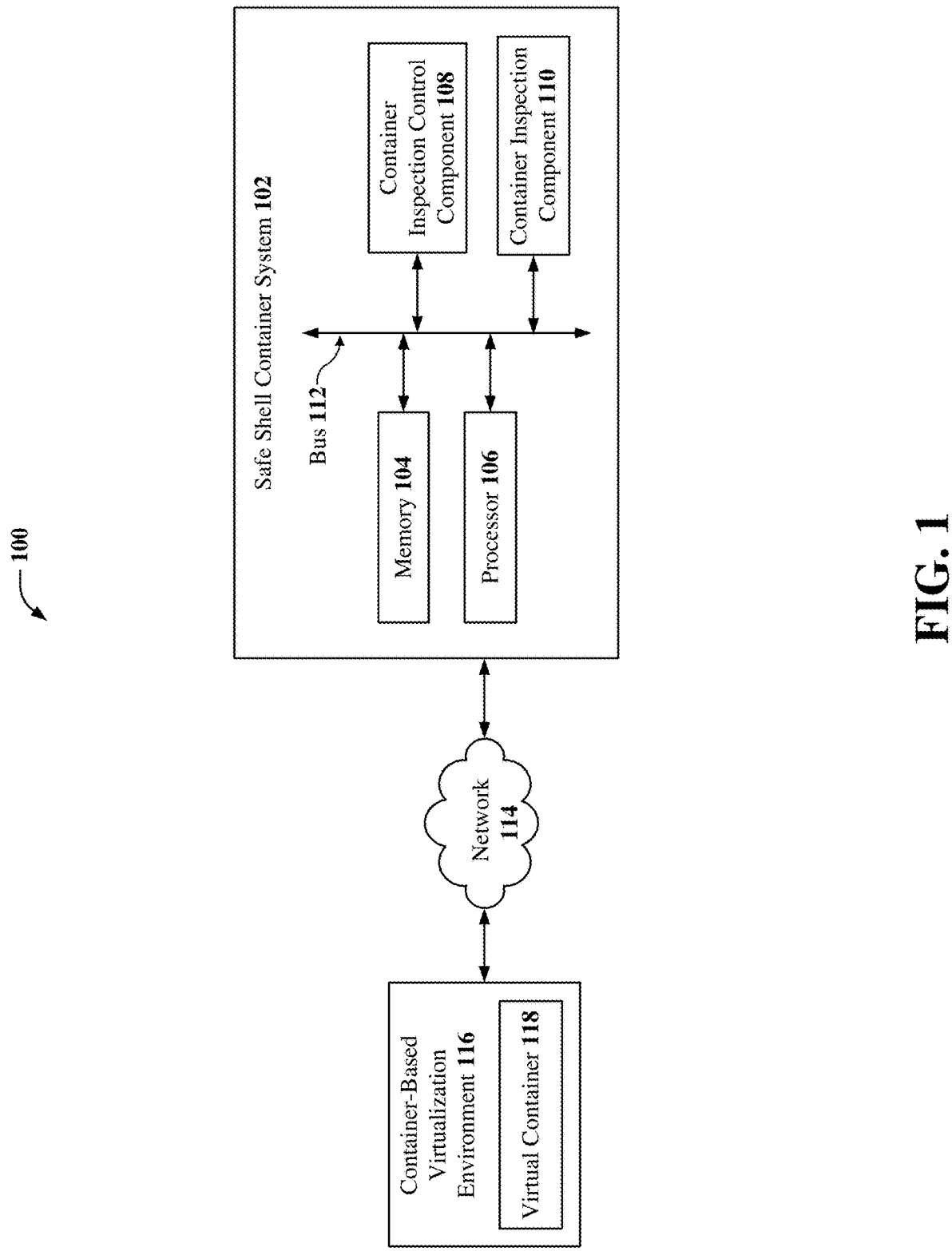
FIG. 1 illustrates a block diagram of an example, non-limiting system that facilitates container inspection components of a container-based virtualization environment in accordance with one or more embodiments described herein.

FIG. 1 illustrates a block diagram of an example, non-limiting system 100 that facilitates container inspection components of a container-based virtualization environment in accordance with one or more embodiments described herein. In some embodiments, such a container-based virtualization environment can comprise a cloud computing environment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise a safe shell container system 102. In some embodiments, safe shell container system 102 can comprise a memory 104, a processor 106, a container inspection control component 108, a container inspection component 110, and/or a bus 112. In some embodiments, safe shell container system 102 can be in communication with one or more container-based virtualization environments 116, via a network 114. In some embodiments, container-based virtualization environment 116 can comprise one or more virtual containers 118.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, safe shell container system 102, container-based virtualization environment 116, and/or virtual container 118 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to safe shell container system 102, container inspection control component 108, container inspection component 110, container-based virtualization environment 116, and/or virtual container 118.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor.

In some embodiments, safe shell container system 102, memory 104, processor 106, container inspection control component 108, and/or container inspection component 110 can be communicatively, electrically, and/or operatively coupled to one another via bus 112 to perform functions of system 100, safe shell container system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, safe shell container system 102 and/or container-based virtualization environment 116 can comprise any type of component, machine, device, facility, apparatus, and/or instrument that comprises a processor and/or can be capable of effective and/or operative communication with a wired and/or wireless network. All such embodiments are envisioned. For example, safe shell container system 102 and/or container-based virtualization environment 116 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, the various components of the system 100 (e.g., safe shell container system 102, container-based virtualization environment 116, virtual container 118, etc.) can be coupled (e.g., communicatively, electrically, operatively, etc.) via a data cable (e.g., High-Definition Multimedia Interface (HDMI), recommended standard (RS) 232, Ethernet cable, etc.). In some embodiments, the various components of the system 100 (e.g., safe shell container system 102, container-based virtualization environment 116, virtual container 118, etc.) can be coupled (e.g., communicatively, electrically, operatively, etc.) via network 114.

According to multiple embodiments, network 114 can comprise wired and wireless networks, including, but not limited to, a cellular network, a wide area network (WAN) (e.g., the Internet) or a local area network (LAN). For example, safe shell container system 102 can communicate with one or more container-based virtualization environments 116 and/or virtual containers 118 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, safe shell container system 102 can thus include hardware (e.g., a central processing unit (CPU), a transceiver, a decoder), software (e.g., a set of threads, a set of processes, software in execution) or a combination of hardware and software that facilitates communicating information between safe shell container system 102 and external systems, sources, and/or devices (e.g., container-based virtualization environment 116, virtual container 118, etc.).

According to multiple embodiments, container-based virtualization environment 116 can comprise a cloud computing environment. For instance, container-based virtualization environment 116 can comprise a cloud computing environment (cloud container environment) hosted by a cloud provider that enables one or more entities (e.g., an end user, such as a guest user, an administrator user, etc.) to execute (run) one or more virtual containers (e.g., virtual guest containers, such as, for example, virtual container 118) on such cloud computing environment (cloud container environment).

According to multiple embodiments, virtual container 118 can comprise a virtual container. As referenced herein, a container or a virtual container can refer to virtual containerization and/or operating system virtualization, where such container or virtual container can comprise an executable package of stand-alone software that can share a single operating system kernel with multiple other containers and can execute (run) on the same virtual machine as multiple other containers.

In some embodiments, virtual container 118 can comprise a virtual container comprising a software application that can execute (run) in container-based virtualization environment 116 by employing one or more resources of container-based virtualization environment 116, where such resources can be shared with other virtual containers of container-based virtualization environment 116. For example, virtual container 118 can comprise a software application that can execute (run) in container-based virtualization environment 116 by employing one or more resources of container-based virtualization environment 116 including, but not limited to, a server device (e.g., host server device), an operating system kernel, memory, a central processing unit (CPU), a network, storage, and/or another resource. In some embodiments, virtual container 118 can be transferred into, out of, and/or within container-based virtualization environment 116. For example, virtual container 118 can comprise a virtual container image that can be uploaded (pushed) into, downloaded (pulled) from, and/or transferred within container-based virtualization environment 116.

According to multiple embodiments, safe shell container system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with safe shell container system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, container inspection control component 108, container inspection component 110, and/or any other components associated with safe shell container system 102 as disclosed herein (e.g., communicatively, electronically, and/or operatively coupled with and/or employed by safe shell container system 102), can comprise such computer and/or machine readable, writable, and/or executable component(s) and/or instruction(s). Consequently, according to numerous embodiments, safe shell container system 102 and/or any components associated therewith as disclosed herein, can employ processor 106 to execute such computer and/or machine readable, writable, and/or executable component(s) and/or instruction(s) to facilitate performance of one or more operations described herein with reference to safe shell container system 102 and/or any such components associated therewith.

According to multiple embodiments, safe shell container system 102 can facilitate performance of operations executed by and/or associated with container inspection control component 108, container inspection component 110, container-based virtualization environment 116, and/or virtual container 118. For example, as described in detail below, safe shell container system 102 can facilitate: defining one or more constrained capabilities of a container inspection and inspecting a virtual container based on the one or more constrained capabilities; defining one or more resource constraint components of a container inspection and inspecting a virtual container based on the one or more resource constraint components; defining one or more inspection operations of a container inspection and inspecting a virtual container based on the one or more inspection operations; defining a level of control of a container inspection based on one or more combinations of one or more control components selected from a group consisting of access control components and resource constraint components; inspecting at least one of a memory state, a disk state, or a network state of a virtual container; inspecting a live runtime state of a virtual container; inspecting a virtual container based on one or more read-only actions; and/or inspecting a virtual container based on prohibited execution of one or more write operations.

According to multiple embodiments, container inspection control component 108 can define one or more inspection operations of a container inspection. For example, container inspection control component 108 can define one or more inspection operations that can (or cannot, in some embodiments) be performed in a virtual container inspection, including, but not limited to, read only operations, prohibited execution of write operations, and/or another inspection operation.

In some embodiments, container inspection control component 108 can define one or more constrained capabilities of a container inspection. For example, container inspection control component 108 can define one or more constrained capabilities, such as, for example, constrained access (e.g., constrained access privileges) to a virtual container being inspected.

In some embodiments, container inspection control component 108 can define one or more resource constraints of a container inspection. For example, container inspection control component 108 can define one or more resource constraints, such as, for example, resource utilization constraints (e.g., constrained utilization of one or more resources of a container-based virtualization environment).

In some embodiments, to facilitate defining such inspection operations, constrained capabilities, and/or resource constraints described above, container inspection control component 108 can employ one or more control components including, but not limited to, access control components, resource constraint components, and/or another control component. For example, to facilitate defining such inspection operations, constrained capabilities, and/or resource constraints described above, container inspection control component 108 can employ one or more control components including, but not limited to, privilege separation, namespace, capability-based security (also referred to as "capabilities"), secure computing mode (seccomp), netfilter, control groups (cgroups), Security-Enhanced Linux (selinux), and/or another control component.

In some embodiments, to facilitate defining such inspection operations, constrained capabilities, and/or resource constraints described above, container inspection control component 108 can employ one or more combinations of one or more control components including, but not limited to, access control components, resource constraint components, and/or another control component. For example, to facilitate defining such inspection operations, constrained capabilities, and/or resource constraints described above, container inspection control component 108 can employ one or more combinations of one or more control components including, but not limited to, privilege separation, namespace, capability-based security (capabilities), seccomp, netfilter, cgroups, selinux, and/or another control component.

In some embodiments, container inspection control component 108 can define one or more inspection operations, constrained capabilities, and/or resource constraints of a container inspection of a virtual container of a container-based virtualization environment. For example, container inspection control component 108 can define such inspection operations, constrained capabilities, and/or resource constraints of an inspection of virtual container 118 of container-based virtualization environment 116, where container-based virtualization environment 116 can comprise a cloud computing environment (cloud container environment).

In some embodiments, to facilitate defining such inspection operations, constrained capabilities, and/or resource constraints described above, container inspection control component 108 can enable generation of one or more container inspection components respectively comprising such defined inspection operations, constrained capabilities, and/or resource constraints. For example, container inspection control component 108 can comprise a user interface (e.g., a command line user interface) that can enable an entity (e.g., an end user, such as a guest user, an administrator user, etc.) to generate one or more container inspection components respectively comprising such defined inspection operations, constrained capabilities, and/or resource constraints. For instance, container inspection control component 108 can enable generation of one or more container inspection components including, but not limited to, a standalone inspection process (e.g., via executing one or more Bourne-Again Shell (BASH) commands), a sidecar container component (e.g., a separate virtual container that can implement an inspection instance), and/or another container inspection component. In this example, generation of such one or more container inspection components can constitute defining such inspection operations, constrained capabilities, and/or resource constraints described above.

According to multiple embodiments, container inspection component 110 can inspect a virtual container. For example, container inspection component 110 can inspect virtual container 118 of container-based virtualization environment 116, via network 114.

In some embodiments, container inspection component 110 can inspect a virtual container based on one or more inspection operations. For example, container inspection component 110 can inspect virtual container 118 based on the one or more inspection operations defined by container inspection control component 108 as described above. For instance, container inspection component 110 can inspect virtual container 118 based on one or more inspection operations including, but not limited to, read only operations, prohibited execution of write operations by container inspection component 110, and/or another inspection operation.

In some embodiments, container inspection component 110 can inspect a virtual container based on one or more constrained capabilities. For example, container inspection component 110 can inspect virtual container 118 based on the one or more constrained capabilities defined by container inspection control component 108 as described above (e.g., constrained access privileges).

In some embodiments, container inspection component 110 can inspect a virtual container based on one or more resource constraints. For example, container inspection component 110 can inspect virtual container 118 based on the one or more resource constraints defined by container inspection control component 108 as described above (e.g., constrained utilization, by container inspection component 110, of one or more resources of container-based virtualization environment 116).

In some embodiments, container inspection component 110 can inspect a state of a virtual container. For example, container inspection component 110 can inspect a state of virtual container 118 including, but not limited to, a memory state, a disk state, a network state, and/or another state. In some embodiments, container inspection component 110 can inspect a live runtime state of a virtual container. For example, container inspection component 110 can inspect a live runtime state (runtime environment) of virtual container 118. For instance, container inspection component 110 can inspect a state of virtual container 118 while virtual container 118 is executing (running) a process (i.e., software application of virtual container 118).

In some embodiments, container inspection component 110 can comprise an inspection instance (e.g., a standalone inspection process, a standalone process instance, inspection process, etc.). For example, container inspection component 110 can comprise an inspection process against virtual container 118 that can be generated via execution of one or more BASH commands input by an entity (e.g., an end user, such as a guest user, an administrator user, etc.) to a user interface of safe shell container system 102 and/or container inspection control component 108 (e.g., a command line user interface, such as, for example, Unix-shell).

In some embodiments, container inspection component 110 can comprise a sidecar container component. For example, container inspection component 110 can comprise a sidecar container component comprising a separate virtual container (e.g., a safe shell container) that can implement an inspection instance (e.g., an inspection process against virtual container 118).

In some embodiments, container inspection component 110 can comprise one or more kernel constructs, security constructs, and/or containerization constructs. For example, container inspection component 110 can comprise a standalone process instance (standalone inspection process) comprising one or more kernel constructs, security constructs, and/or containerization constructs. In another example, container inspection component 110 can comprise a sidecar container component comprising one or more kernel constructs, security constructs, and/or containerization constructs.

In some embodiments, an entity of virtual container 118 can employ container inspection component 110 to inspect virtual container 118. For example, an entity (e.g., entity 302 described below with reference to FIG. 3) of virtual container 118 including, but not limited to, an end user, such as a guest user, an administrator user, and/or another entity of virtual container 118 that can employ container inspection component 110 to inspect a live runtime state of virtual container 118. For instance, such an entity of virtual container 118 can employ container inspection component 110 to inspect a live runtime state of virtual container 118 including, but not limited to, resource usage, application behavior, performance metrics (e.g., throughput, latency of the application, etc.), and/or another live runtime state.

In some embodiments, safe shell container system 102 and/or container inspection control component 108 can comprise a user interface (e.g., a command line user interface, such as, for example, Unix-shell) that can enable an entity to generate and/or employ container inspection component 110 to inspect virtual container 118. For example, in some embodiments, container inspection component 110 can comprise a sidecar container component comprising a separate virtual container (e.g., a safe shell container) as described above and an entity (e.g., entity 302) can utilize such a user interface to access (virtually) and/or employ such a sidecar container component to inspect virtual container 118 (e.g., as illustrated in FIG. 3, FIG. 4, FIG. 5, FIG. 6, and FIG. 7).

Figure 2:
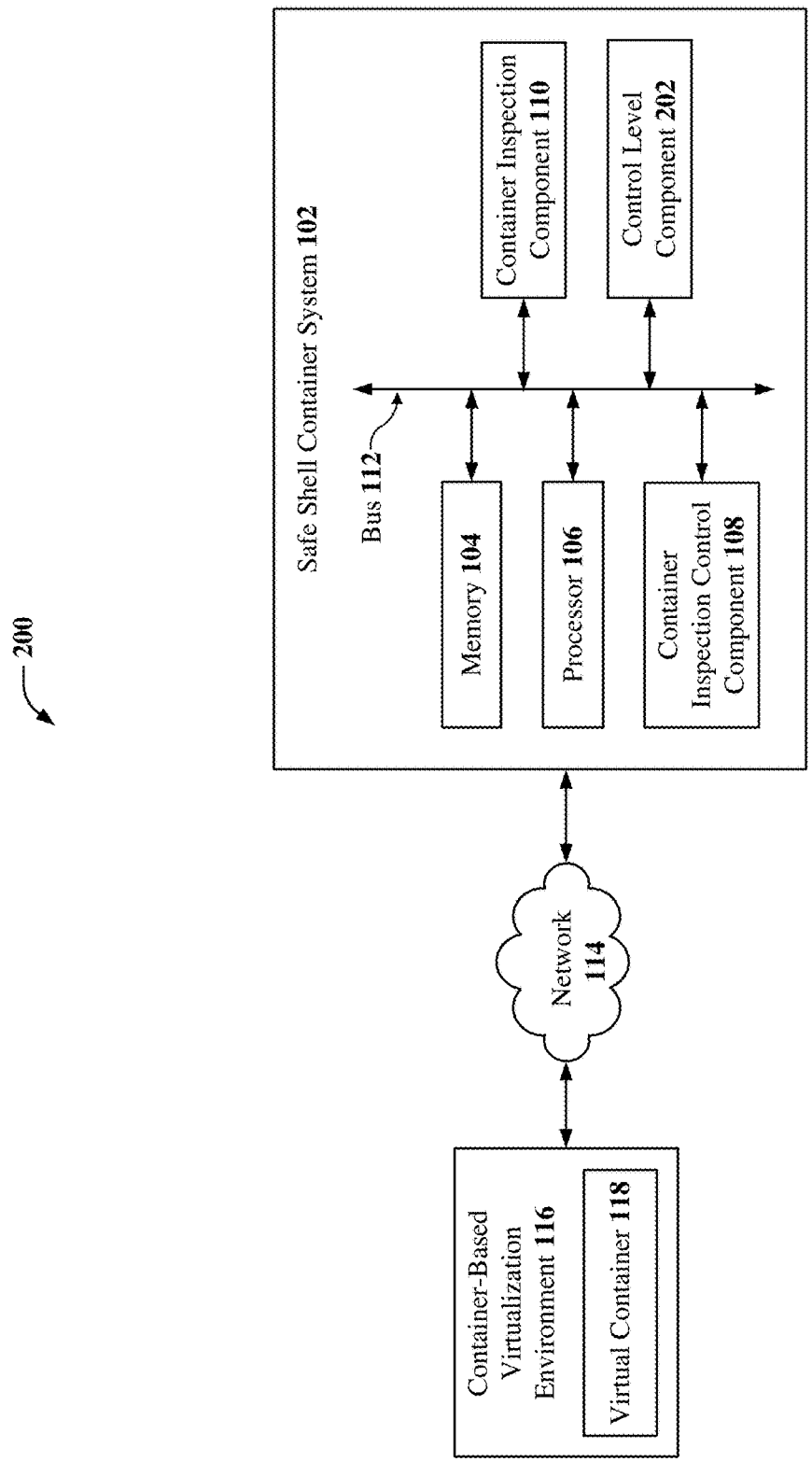
FIG. 2 illustrates a block diagram of an example, non-limiting system that facilitates container inspection components of a container-based virtualization environment in accordance with one or more embodiments described herein.

FIG. 2 illustrates a block diagram of an example, non-limiting system 200 that facilitates container inspection components of a container-based virtualization environment in accordance with one or more embodiments described herein. Repetitive description of like elements employed in respective embodiments is omitted for sake of brevity. According to several embodiments, system 200 can comprise safe shell container system 102. In some embodiments, safe shell container system 102 can comprise a control level component 202.

According to multiple embodiments, control level component 202 can define a level of control of a container inspection component based on one or more combinations of one or more control components selected from a group consisting of access control components and resource constraint components. For example, control level component 202 can define a level of control of container inspection component 110 based on one or more combinations of one or more control components including, but not limited to, access control components, resource constraint components, and/or other control components. For instance, control level component 202 can define a level of control of container inspection component 110 based on one or more combinations of one or more control components including, but not limited to, privilege separation, namespace, capability-based security (capabilities), seccomp, netfilter, cgroups, selinux, and/or another control component.

In some embodiments, container inspection control component 108 can employ control level component 202 to facilitate defining a level of control of container inspection component 110 based on one or more combinations of one or more control components (e.g., access control components, resource constraint components, etc.). For example, container inspection control component 108 can employ control level component 202 to define a certain level of access privilege of container inspection component 110 by combining a certain control component that enables broad access to virtual container 118 with another control component that constrains (limits) such broad access. In another example, container inspection control component 108 can employ control level component 202 to define a certain level of resource utilization by container inspection component 110 by combining a certain control component that enables broad utilization of a resource(s) of virtual container 118 (or container-based virtualization environment 116) with another control component that constrains (limits) such broad resource utilization. In these examples, defining such levels of access privilege and/or resource utilization can constitute fine-tuning a level of control of container inspection component 110, which can, in some embodiments, facilitate customization of a level of control of container inspection component 110.

It should be appreciated that safe shell container system 102 can facilitate a secure inspection of a live (real-time, runtime) state of a virtual container using read only operations (i.e., no write privileges), thereby eliminating the potential to create side-effects including, but not limited to, modifying files, deleting files, installing packages, removing packages, crashing processes, downloading content, uploading content, inadvertent application impact, runtime environment perturbation, broken application dependency, altering application behavior, application performance degradation, change network connectivity, hogging (monopolizing) resources (e.g., CPU, memory, ports, etc.), rootkit installation, privilege escalation, potential vulnerability introduction, container immutability ideal violation, and/or other side-effects. It should be appreciated that safe shell container system 102 can enable read only operations including, but not limited to, reading files (e.g., configurations, logs, data, etc.), querying package database (e.g., system, application, etc.), listing running process, viewing open connections, watching resource usage (e.g., CPU, memory, network, disk, etc.), tracking application performance, running vulnerability and compliance checks, packet analysis, event profiling, and/or other read only operations. It should be appreciated that safe shell container system 102 can provide a familiar operating system (OS) interface (e.g., container inspection component 110 can be a familiar OS interface). It should be appreciated that safe shell container system 102 can provide utility-reuse (e.g., an entity employing safe shell container system 102 can reuse utilities such as, netcat, packet filter (pf), etc.).

In some embodiments, safe shell container system 102 can be a virtual container inspection system and/or process associated with various technologies. For example, safe shell container system 102 can be associated with container-based virtualization technologies, containerization technologies, cloud-based computing technologies, cloud container technologies, secure shell technologies, virtual operating system technologies, virtual computing technologies, and/or other technologies.

In some embodiments, safe shell container system 102 can provide technical improvements to systems, devices, components, operational steps, and/or processing steps associated with the various technologies identified above. For example, safe shell container system 102 can enable an entity to inspect one or more live runtime states of a virtual container using read only operations (i.e., no write privileges), without requiring such entity to directly access the virtual container, thereby eliminating the potential to intentionally or inadvertently modify any aspect of the virtual container during the inspection.

In addition, in some embodiments, safe shell container system 102 can facilitate defining and/or adjusting of a level of control over such inspection of a virtual container, without modifying an operating system kernel utilized by the virtual container. For instance, to facilitate defining and/or adjusting such a level of control, safe shell container system 102 can generate a container inspection component (e.g., container inspection component 110) comprising combinations of broad and narrow (constrained) capabilities, as well as broad and narrow (constrained) resource utilization privileges. In some embodiments, such combinations can facilitate customization and/or fine-tuning of the level of control that safe shell container system 102 can apply over to the virtual container inspection.

In some embodiments, safe shell container system 102 can facilitate improved security associated with at least one of: a container inspection component (e.g., container inspection component 110); a virtual container (e.g., virtual container 118); or one or more resources of a container-based virtualization environment (e.g., a CPU, associated with one or more resources of container-based virtualization environment 116). For example, safe shell container system 102 can define and/or generate a container inspection component (e.g., container inspection component 110) using one or more access control components (e.g., privilege separation 402A, namespaces 402B, capabilities 402C, seccomp 402D, netfilter 402E, etc.) and/or resource constraint components (e.g., cgroups 404A, selinux 404B, etc.), which can protect the virtual container and/or resources of the container-based virtualization environment from unwanted access by the container inspection component and further protect the container inspection component from unwanted access by a remote entity (e.g., a third-party entity).

In some embodiments, safe shell container system 102 can provide technical improvements to a processing unit associated with one or more resources of a container-based virtualization environment (e.g., a CPU, associated with one or more resources of container-based virtualization environment 116). For example, safe shell container system 102 can define and/or generate a container inspection component (e.g., container inspection component 110) using one or more resource constraint components (e.g., cgroups 404A, selinux 404B, etc.), which can limit the resource usage by the container inspection component of one or more resources (e.g., a CPU, a memory, a network, a kernel, kernel provided ports, etc.) of such container-based virtualization environment (e.g., container-based virtualization environment 116). In this example, such resource constraint component(s) can limit (constrain) the container inspection component's ability to utilize such resources of the container-based virtualization environment, thereby allowing such resources to be available (i.e., have capacity) to execute other operations. In addition, in some embodiments, safe shell container system 102 can prevent execution of one or more write operations by the container inspection component, thereby facilitating a safer inspection ability, without hampering the processing capacity associated with one or more resources of the container-based virtualization environment.

In some embodiments, safe shell container system 102 can employ hardware and/or software to solve problems that are highly technical in nature, that are not abstract and that cannot be performed as a set of mental acts by a human. For example, safe shell container system 102 can automatically define one or more constrained capabilities and/or resource constraints of a virtual container inspection and generate a standalone process instance of a container inspection component (e.g., via BASH commands and/or a sidecar container embodiment) that can facilitate inspection of one or more live runtime states (e.g., memory state, disk state, network state, etc.) of a virtual container in a container-based virtual environment. In this example, such a container inspection component can enable an entity (e.g., a human user) to facilitate such an inspection of the virtual container without such entity directly accessing the virtual container.

It is to be appreciated that safe shell container system 102 can perform a virtual container inspection process utilizing various combinations of electrical components, mechanical components, and circuitry that cannot be replicated in the mind of a human or performed by a human. For example, generating a standalone process instance of a container inspection component that can comprise various combinations of broad and narrow capabilities and/or resource constraints, and further implementing such container inspection component in a container-based virtual environment to inspect a live runtime state of a virtual container, are operations that are greater than the capability of a human mind. For instance, the amount of data processed, the speed of processing such data, and/or the types of data processed by safe shell container system 102 over a certain period of time can be greater, faster, and/or different than the amount, speed, and/or data type that can be processed by a human mind over the same period of time.

According to several embodiments, safe shell container system 102 can also be fully operational towards performing one or more other functions (e.g., fully powered on, fully executed, etc.) while also performing the above-referenced virtual container inspection process. It should be appreciated that such simultaneous multi-operational execution is beyond the capability of a human mind. It should also be appreciated that safe shell container system 102 can include information that is impossible to obtain manually by an entity, such as a human user. For example, the type, amount, and/or variety of information included in container inspection control component 108, container inspection component 110, container-based virtualization environment 116, virtual container 118, control level component 202, system 300, system 400, system 500, system 600, and/or system 700 can be more complex than information obtained manually by a human user.

Figure 3:
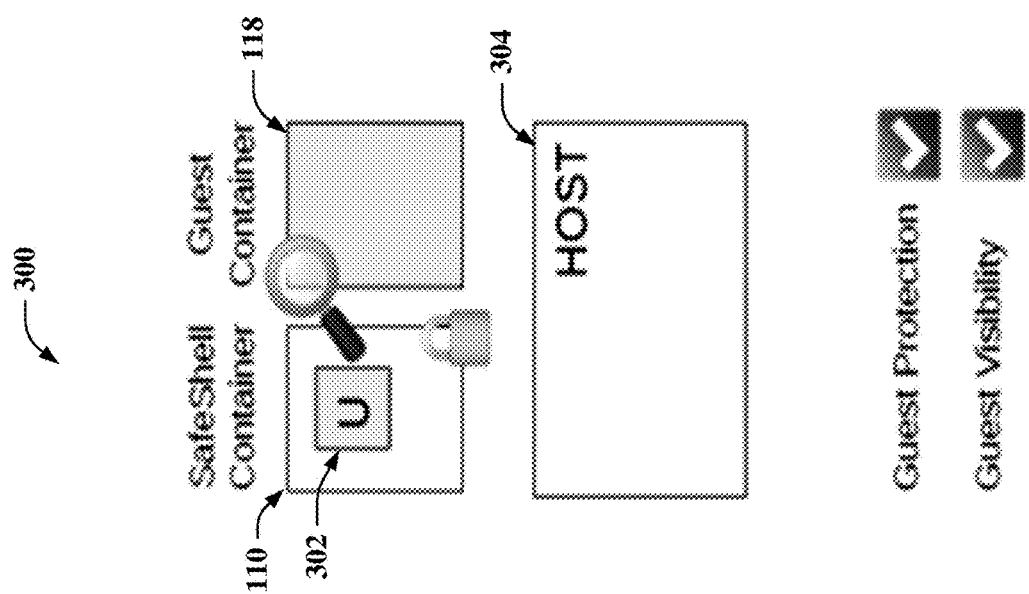
FIG. 3 illustrates a block diagram of an example, non-limiting system that facilitates container inspection components of a container-based virtualization environment in accordance with one or more embodiments described herein.

FIG. 3 illustrates a block diagram of an example, non-limiting system 300 that facilitates container inspection components of a container-based virtualization environment in accordance with one or more embodiments described herein. Repetitive description of like elements employed in respective embodiments is omitted for sake of brevity. According to several embodiments, system 300 can comprise an alternative, non-limiting example embodiment of system 100 and/or system 200.

In some embodiments, system 300 can comprise container inspection component 110 (depicted as "SafeShell Container" in the embodiment illustrated in FIG. 3). In some embodiments, container inspection component 110 can comprise an entity 302 (depicted as "U" in the embodiment illustrated in FIG. 3), where the embodiment illustrated in FIG. 3 can represent entity 302 implementing container inspection component 110 to inspect virtual container 118 (depicted as "Guest Container" in the embodiment illustrated in FIG. 3). In some embodiments, entity 302 can comprise an entity of virtual container 118 including, but not limited to, an end user, such as a guest user, an administrator user, and/or another entity of virtual container 118 that can employ container inspection component 110 to inspect virtual container 118. In some embodiments, system 300 can comprise a host 304, where host 304 can comprise a host of container-based virtualization environment 116. For example, host 304 can comprise a server device that can represent a cloud provider of container-based virtualization environment 116.

In some embodiments, container inspection control component 108 can employ one or more control components to protect virtual container 118 during an inspection, while enabling visibility of virtual container 118 (e.g., states of virtual container 118). For example, as described above with reference to FIG. 1 and FIG. 2, container inspection control component 108 can employ such control components to define capabilities and/or constraints of container inspection component 110, where container inspection component 110 can be employed (e.g., by entity 302) to inspect virtual container 118 based on such capabilities and/or constraints.

In some embodiments, container inspection control component 108 can employ one or more control components to define visibility capabilities (depicted as a magnifying glass icon illustrated in the embodiment of FIG. 3) and/or constraints (depicted as a padlock illustrated in the embodiment of FIG. 3) of container inspection component 110, where container inspection component 110 can be employed by entity 302 to inspect virtual container 118 based on such visibility capabilities and/or constraints. For example, as described above with reference to FIG. 1 and FIG. 2, container inspection control component 108 can define such visibility capabilities (e.g., read only rights) and/or constraints (e.g., prohibited execution of write operations) by employing one or more control components (or combinations thereof) including, but not limited to, privilege separation, namespace, capability-based security (capabilities), seccomp, netfilter, cgroups, selinux, and/or another control component. In this example, defining such visibility capabilities and/or constraints can facilitate visibility by entity 302 (e.g., from the virtual confines of container inspection component 110) into virtual container 118 while protecting virtual container 118 from modification by entity 302 and/or container inspection component 110.

Figure 4:
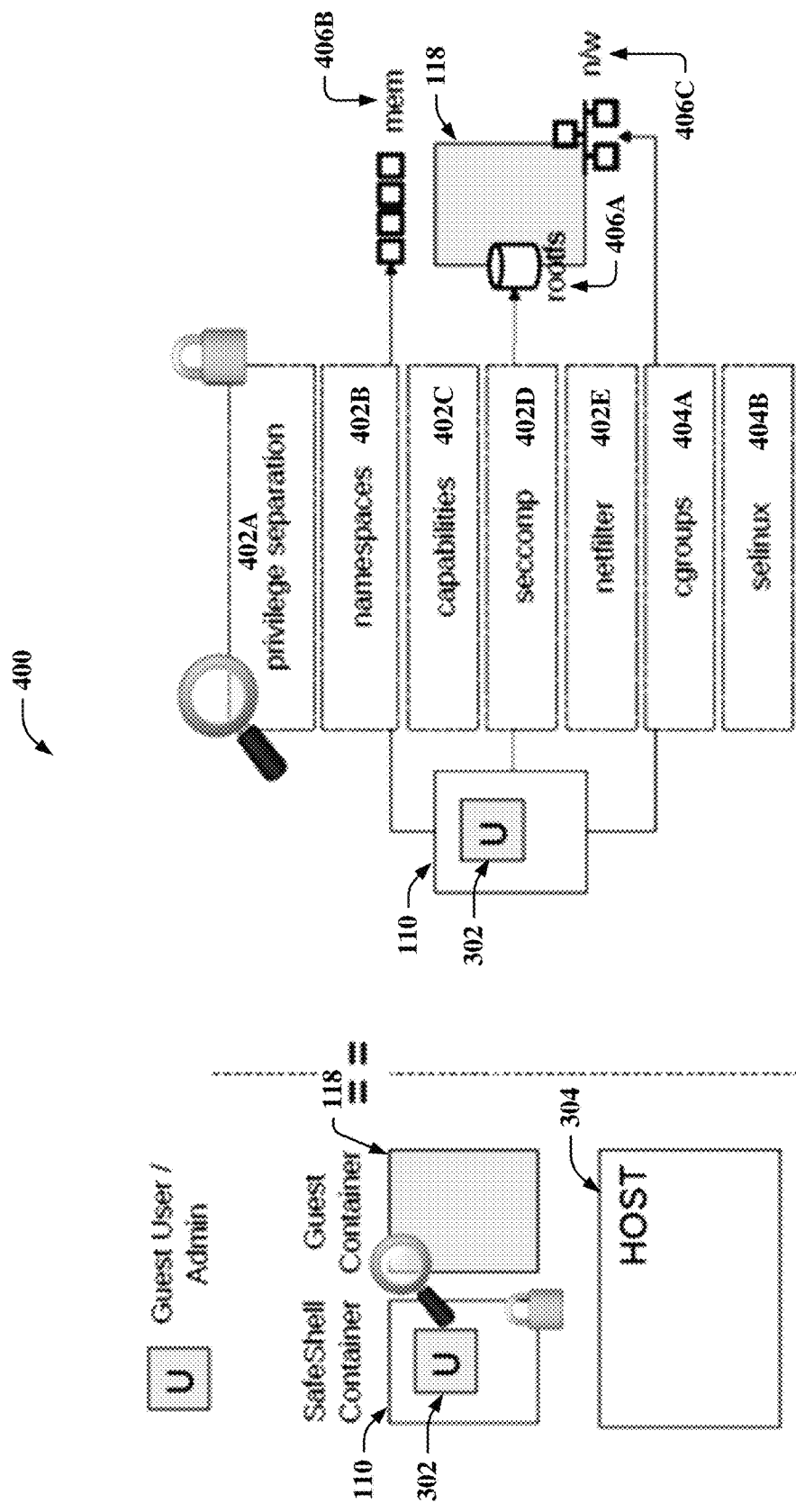
FIG. 4 illustrates a block diagram of an example, non-limiting system that facilitates container inspection components of a container-based virtualization environment in accordance with one or more embodiments described herein.

FIG. 4 illustrates a block diagram of an example, non-limiting system 400 that facilitates container inspection components of a container-based virtualization environment in accordance with one or more embodiments described herein. Repetitive description of like elements employed in respective embodiments is omitted for sake of brevity. According to several embodiments, system 400 can comprise an alternative, non-limiting example embodiment of system 100, system 200, and/or system 300.

In some embodiments, system 400 can comprise container inspection component 110 that can be generated by container inspection control component 108 by employing one or more control components (e.g., as described above with reference to FIG. 1 and FIG. 2). In some embodiments, such control components can comprise one or more access control components including, but not limited to, privilege separation 402A, namespaces 402B, capabilities 402C, seccomp 402D, netfilter 402E, and/or another access control component. In some embodiments, such control components can comprise one or more resource constraint components including, but not limited to, cgroups 404A, selinux 404B, and/or another resource constraint component.

In some embodiments, system 400 can comprise virtual container 118, which can comprise one or more states that can be inspected by container inspection component 110. For example, virtual container 118 can comprise states including, but not limited to, a disk state 406A (depicted as "rootfs" in the embodiment illustrated in FIG. 4), a memory state 406B (depicted as "mem" in the embodiment illustrated in FIG. 4), a network state 406C (depicted as "n/w" in the embodiment illustrated in FIG. 4), and/or another state.

In some embodiments, as described above with reference to FIG. 1, FIG. 2, and FIG. 3, entity 302 can employ container inspection component 110 to inspect one or more live runtime states of virtual container 118 based on one or more control components. For example, entity 302 can employ container inspection component 110 to inspect live runtime states including, but not limited to, disk state 406A, memory state 406B, and/or network state 406C based on control components including, but not limited to, privilege separation 402A, namespaces 402B, capabilities 402C, seccomp 402D, netfilter 402E, cgroups 404A, and/or selinux 404B. In some embodiments, entity 302 can employ container inspection component 110 to inspect log files of disk state 406A. In some embodiments, entity 302 can employ container inspection component 110 to inspect memory state 406B to see what processes are running In some embodiments, entity 302 can employ container inspection component 110 to inspect network state 406C to see: open network connections; data transfer rate; and/or entities communicating with virtual container 118.

Figure 5:
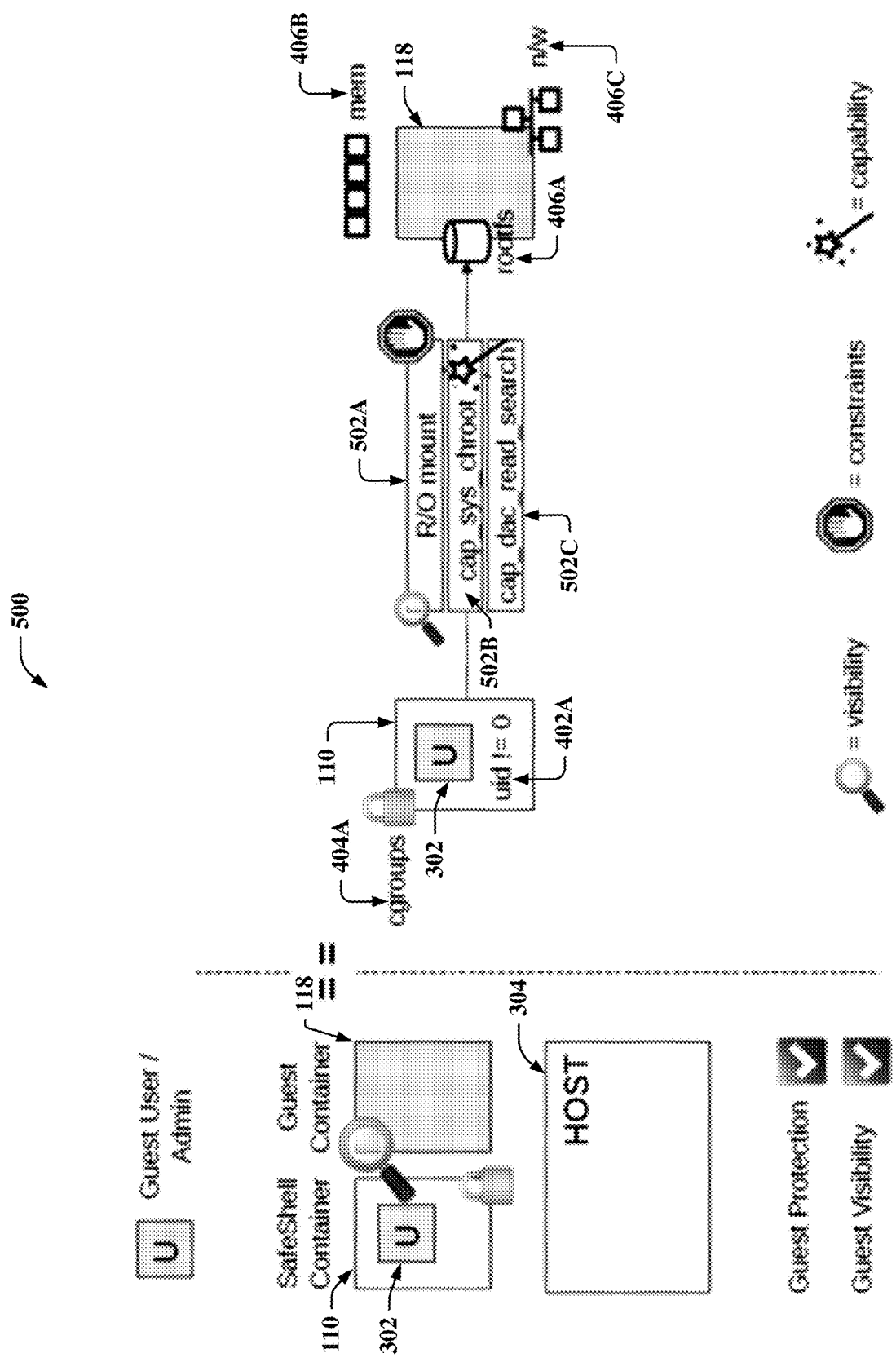
FIG. 5 illustrates a block diagram of an example, non-limiting system that facilitates container inspection components of a container-based virtualization environment in accordance with one or more embodiments described herein.

FIG. 5 illustrates a block diagram of an example, non-limiting system 500 that facilitates container inspection components of a container-based virtualization environment in accordance with one or more embodiments described herein. Repetitive description of like elements employed in respective embodiments is omitted for sake of brevity. According to several embodiments, system 500 can comprise an alternative, non-limiting example embodiment of system 100, system 200, system 300, and/or system 400.

In some embodiments, container inspection control component 108 can employ one or more combinations of access control components and/or resource constraint components to define capabilities (e.g., access, visibility, read privileges, etc.) and/or constraints (e.g., resource constraints, prohibited write privileges, etc.) of container inspection component 110. In the embodiment illustrated in FIG. 5, capabilities are depicted as magnifying glass icons (to represent visibility) and star wand icons (to represent access, read privileges, write privileges, etc.), whereas constraints are depicted as human hand icons (to represent resource constraints, prohibited write privileges, etc.). For example, container inspection control component 108 can employ control level component 202 to combine one or more access control components with one or more resource constraint components.

In some embodiments, container inspection control component 108 can employ control level component 202 to combine an access control component, such as, for example, privilege separation 402A (depicted as "uid !=0" in the embodiment illustrated in FIG. 5) with a resource constraint component, such as, for example, cgroups 404A. In some embodiments, cgroups 404A can comprise a resource constraint component (e.g., a kernel construct) that can facilitate constraining resource usage by container inspection component 110 including, but not limited to, memory usage, CPU usage, and/or other resource usage. For example, cgroups 404A can facilitate constraining resource usage by container inspection component 110 of one or more resources of container-based virtualization environment 116. In some embodiments, privilege separation 402A (uid !=0) can facilitate operating container inspection component 110 as a non-root user (also known as an unprivileged user). For example, privilege separation 402A (uid !=0) can facilitate operating container inspection component 110 as a non-root user (as opposed to a root user), which can limit potential impact to virtual container 118, host 304, and/or another resource of container-based virtualization environment 116.

In some embodiments, container inspection control component 108 can employ control level component 202 to combine multiple access control components, where at least one of such access control components can serve as a constraint (e.g., an access constraint). For example, container inspection control component 108 can employ control level component 202 to combine R/O mount 502A with cap_sys_chroot 502B and/or cap_dac_read_search 502C.

In some embodiments, R/O mount 502A can enable container inspection component 110 to access disk state 406A but not read privileged files, whereas cap_sys_chroot 502B and cap_dac_read_search 502C can enable container inspection component 110 to read such privileged files (e.g., via bypassing Discretionary Access Control (DAC)). In such embodiments, container inspection component 110 and/or control level component 202 can mount the root filesystem (rootfs) of virtual container 118 into container inspection component 110 using read only mount R/O mount 502A.

Figure 6:
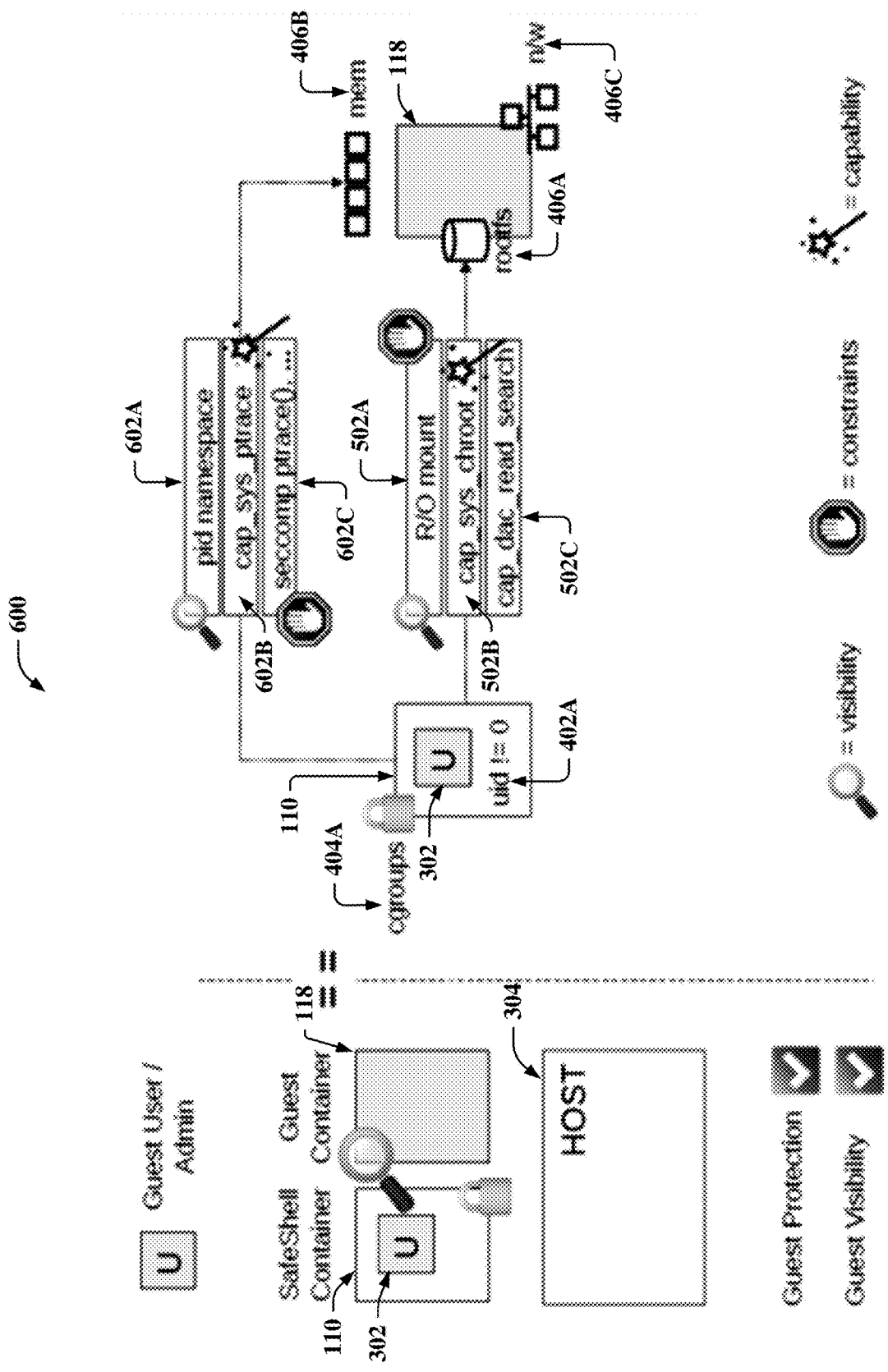
FIG. 6 illustrates a block diagram of an example, non-limiting system that facilitates container inspection components of a container-based virtualization environment in accordance with one or more embodiments described herein.

FIG. 6 illustrates a block diagram of an example, non-limiting system 600 that facilitates container inspection components of a container-based virtualization environment in accordance with one or more embodiments described herein. Repetitive description of like elements employed in respective embodiments is omitted for sake of brevity. According to several embodiments, system 600 can comprise an alternative, non-limiting example embodiment of system 100, system 200, system 300, system 400, and/or system 500.

In some embodiments, container inspection control component 108 can employ control level component 202 to combine multiple access control components, where at least one of such access control components can serve as a constraint (e.g., to prohibit execution of write operations). For example, container inspection control component 108 can employ control level component 202 to combine pid namespace 602A with cap_sys_ptrace 602B and/or seccomp ptrace( ) 602C.

In some embodiments, container inspection control component 108 and/or control level component 202 can share pid namespace 602A, which can comprise a kernel construct that can enable container inspection component 110 to access memory state 406B to see, for example, running processes and/or resources of virtual container 118 and/or host 304. In some embodiments, cap_sys_ptrace 602B can enable container inspection component 110 to access privilege files on memory state 406B (e.g., proc filesystem (procfs) of memory state 406B). In some embodiments, cap_sys_ptrace 602B can enable container inspection component 110 to read and/or write privileges (e.g., execute write operations). Therefore, in some embodiments, container inspection control component 108 and/or control level component 202 can employ seccomp ptrace( ) 602C to prevent container inspection component 110 and/or entity 302 from executing write operations (e.g., terminating a process of virtual container 118 and/or host 304). In such embodiments, the combination of pid namespace 602A with cap_sys_ptrace 602B and seccomp ptrace( ) 602C can enable container inspection component 110 and/or entity 302 to have ptrace read capability of memory state 406B.

Figure 7:
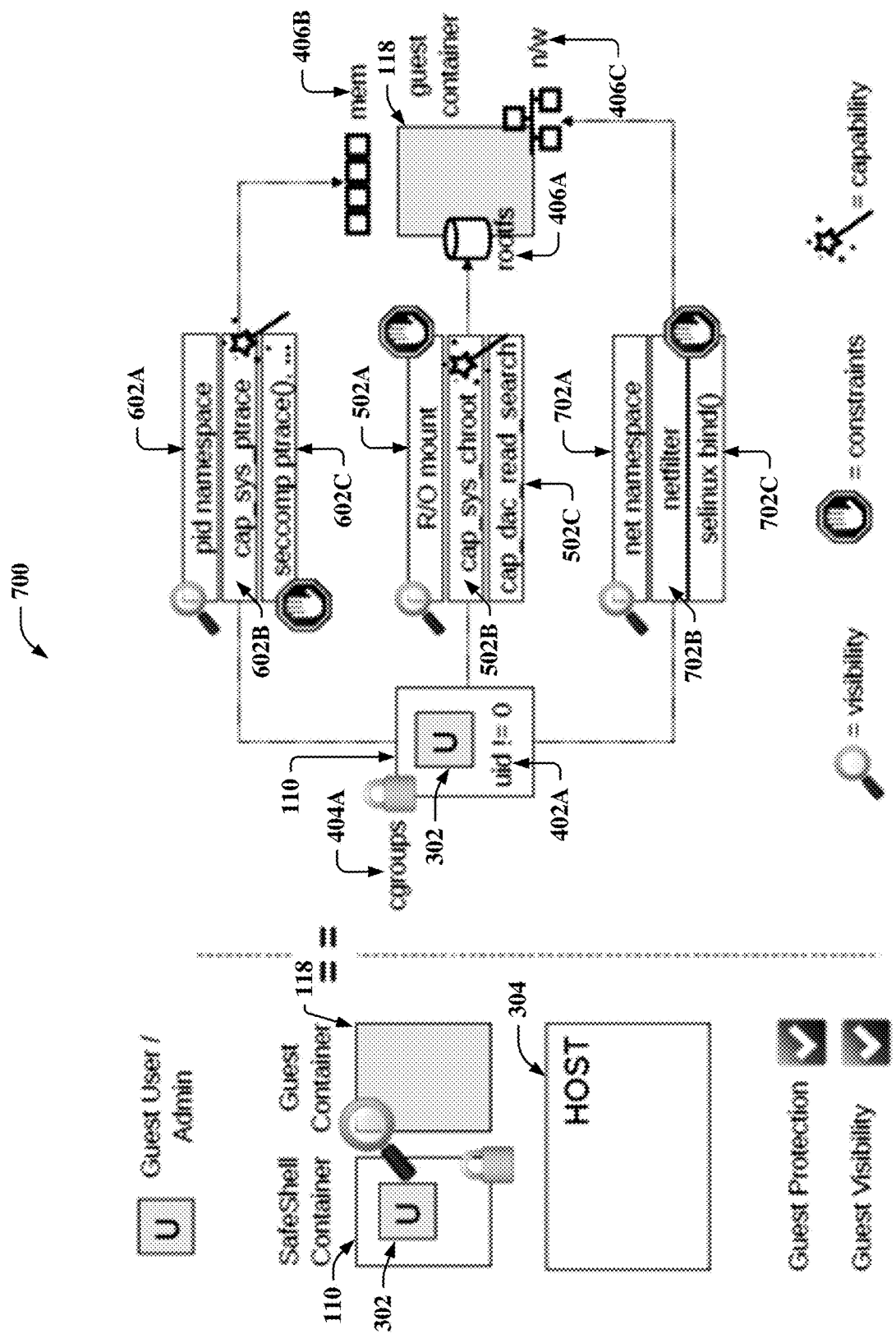
FIG. 7 illustrates a block diagram of an example, non-limiting system that facilitates container inspection components of a container-based virtualization environment in accordance with one or more embodiments described herein.

FIG. 7 illustrates a block diagram of an example, non-limiting system 700 that facilitates container inspection components of a container-based virtualization environment in accordance with one or more embodiments described herein. Repetitive description of like elements employed in respective embodiments is omitted for sake of brevity. According to several embodiments, system 700 can comprise an alternative, non-limiting example embodiment of system 100, system 200, system 300, system 400, system 500, and/or system 600.

In some embodiments, container inspection control component 108 can employ control level component 202 to combine multiple access control components with one or more resource constraint components. For example, container inspection control component 108 can employ control level component 202 to combine net namespace 702A with netfilter 702B and/or selinux bind( ) 702C.

In some embodiments, container inspection control component 108 and/or control level component 202 can share net namespace 702A, which can enable container inspection component 110 to see virtual container 118 network utilization. For example, net namespace 702A can enable container inspection component 110 and/or entity 302 to access network state 406C to see network information including, but not limited to, open network connections of virtual container 118, amount of data received by and/or transferred by virtual container 118, and/or other information.

In some embodiments, net namespace 702A can enable container inspection component 110 to communicate (e.g., transfer and/or receive data, files, etc.) with an entity outside of virtual container 118 (e.g., a remote entity or third-party entity, such as, for example, an entity of container-based virtualization environment 116 or another entity). In such embodiments, net namespace 702A can create a security risk to virtual container 118, virtual containers adjacent to virtual container 118, and/or host 304 (e.g., a risk of an outside entity hijacking virtual container 118), as net namespace 702A can enable network access by container inspection component 110. Therefore, in some embodiments, container inspection control component 108 and/or control level component 202 can employ netfilter 702B to prevent container inspection component 110 and/or entity 302 from receiving and/or transmitting any packets (e.g., communication, data, files, etc.) via such network access.

In some embodiments, container inspection control component 108 and/or control level component 202 can employ selinux bind( ) 702C, which can limit (constrain) the number of kernel provided ports container inspection component 110 can bind to, thereby allowing most ports provided by a kernel (e.g., a kernel of host 304) to be available to virtual container 118 to execute operations. For example, container inspection control component 108 and/or control level component 202 can employ selinux bind( ) 702C to limit container inspection component 110 to bind to a low number of ports (e.g., 10 ports) and/or to local ports. In this example, selinux bind( ) 702C can prevent container inspection component 110 from binding to any and/or all available ports provided by a kernel (e.g., a kernel of host 304), which can result in no ports available to an application of virtual container 118 to bind to and execute operations.

Figure 8:
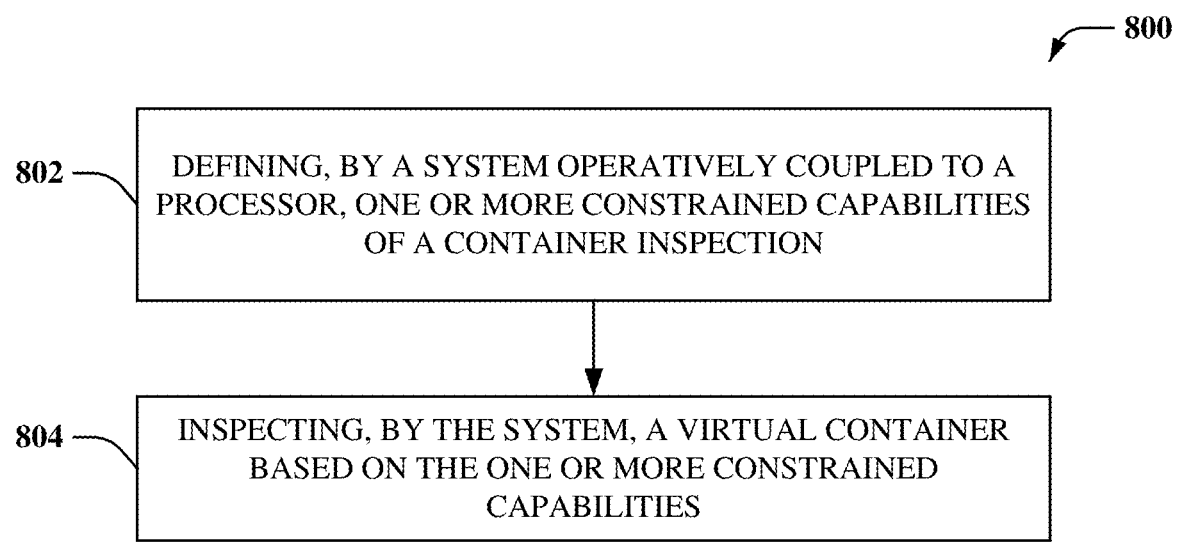
FIG. 8 illustrates a flow diagram of an example, non-limiting computer-implemented method that facilitates container inspection components of a container-based virtualization environment in accordance with one or more embodiments described herein.

FIG. 8 illustrates a flow diagram of an example, non-limiting computer-implemented method 800 that facilitates container inspection components of a container-based virtualization environment in accordance with one or more embodiments described herein. Repetitive description of like elements employed in other embodiments described herein is omitted for sake of brevity.

At 802, defining, by a system (e.g., via safe shell container system 102 and/or container inspection control component 108) operatively coupled to a processor (e.g., processor 106), one or more constrained capabilities (e.g., access privileges, visibility, read operations, write operations, etc.) of a container inspection (e.g., inspection of one or more states of a virtual container of a container-based virtualization environment).

At 804, inspecting, by the system (e.g., via safe shell container system 102, container inspection component 110, and/or entity 302 implementing container inspection component 110), a virtual container (e.g., virtual container 118) based on the one or more constrained capabilities.

Figure 9:
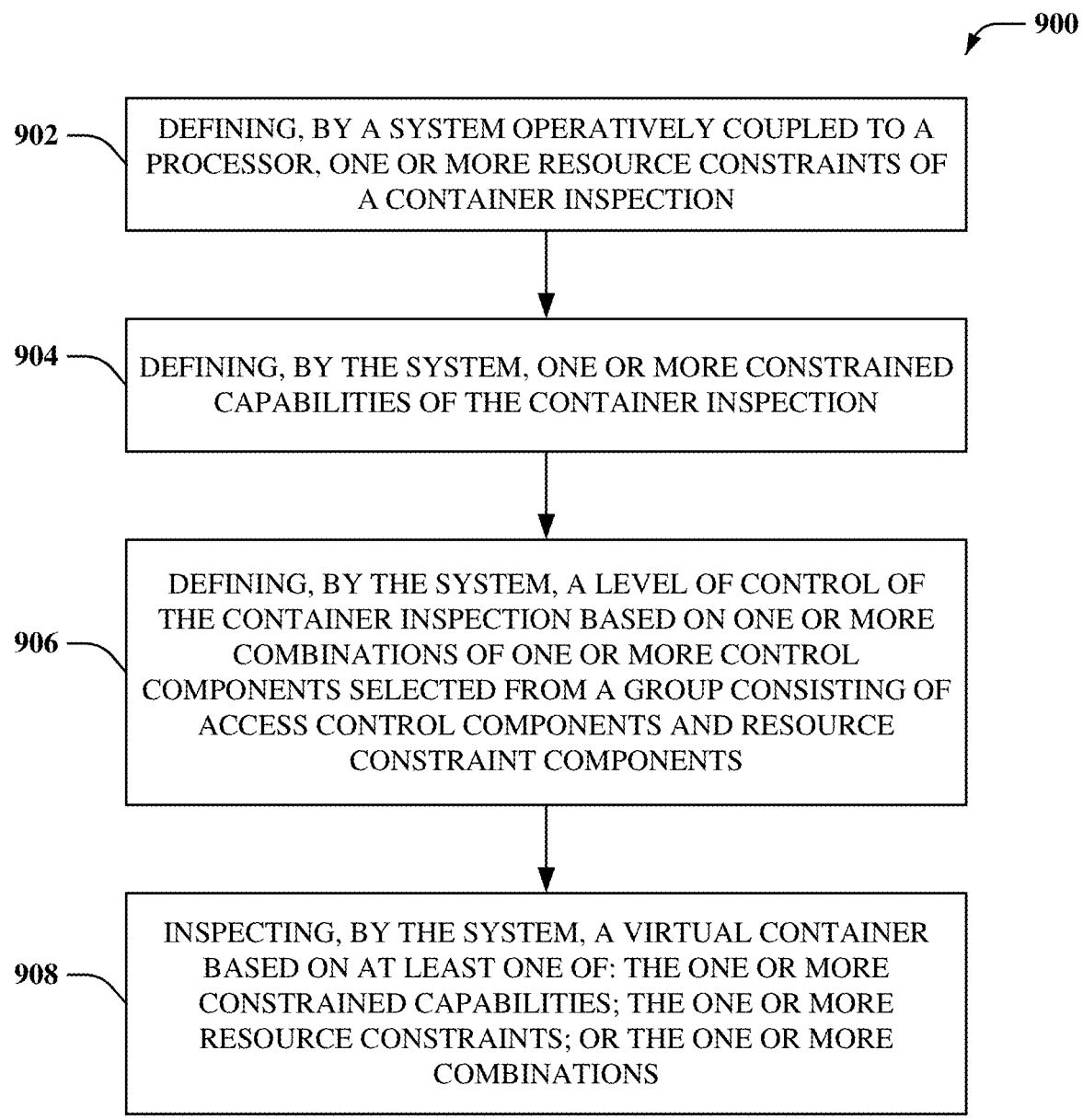
FIG. 9 illustrates a flow diagram of an example, non-limiting computer-implemented method that facilitates container inspection components of a container-based virtualization environment in accordance with one or more embodiments described herein.

FIG. 9 illustrates a flow diagram of an example, non-limiting computer-implemented method 900 that facilitates container inspection components of a container-based virtualization environment in accordance with one or more embodiments described herein. Repetitive description of like elements employed in other embodiments described herein is omitted for sake of brevity.

At 902, defining, by a system (e.g., via safe shell container system 102 and/or container inspection control component 108) operatively coupled to a processor (e.g., processor 106), one or more resource constraints (e.g., resource utilization constraints) of a container inspection (e.g., inspection of one or more states of a virtual container of a container-based virtualization environment).

At 904, defining, by the system (e.g., via safe shell container system 102 and/or container inspection control component 108), one or more constrained capabilities (e.g., access privileges, visibility, read operations, write operations, etc.) of the container inspection.

At 906, defining, by the system (e.g., via safe shell container system 102, container inspection control component 108, and/or control level component 202), a level of control of the container inspection based on one or more combinations of one or more control components selected from a group consisting of access control components (e.g., privilege separation 402A, namespaces 402B, capabilities 402C, seccomp 402D, netfilter 402E, etc.) and resource constraint components (e.g., cgroups 404A, selinux 404B, etc).

At 908, inspecting, by the system (e.g., via safe shell container system 102, container inspection component 110, and/or entity 302 implementing container inspection component 110), a virtual container (e.g., virtual container 118) based on at least one of: the one or more constrained capabilities; the one or more resource constraints; or the one or more combinations.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
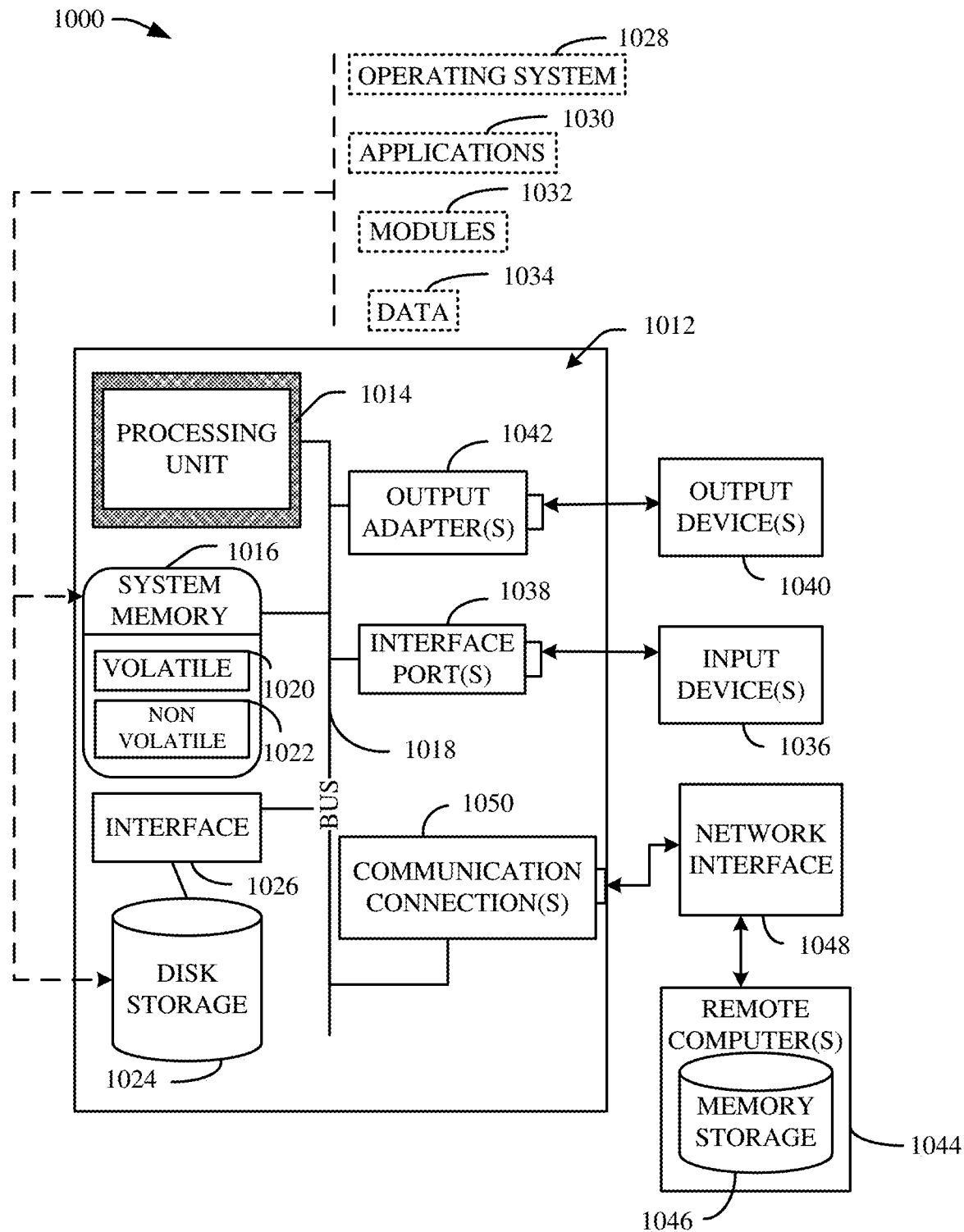
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
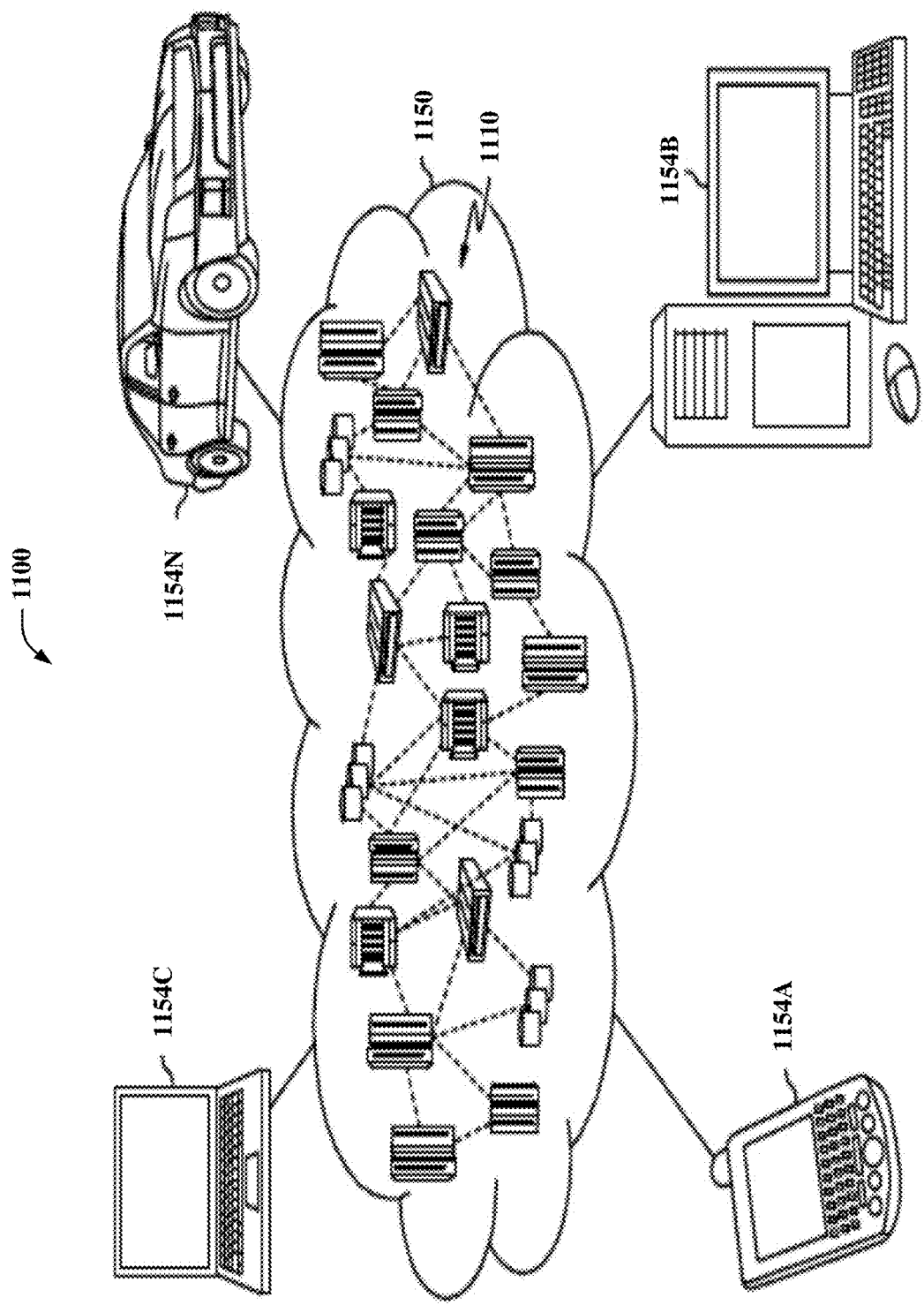
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
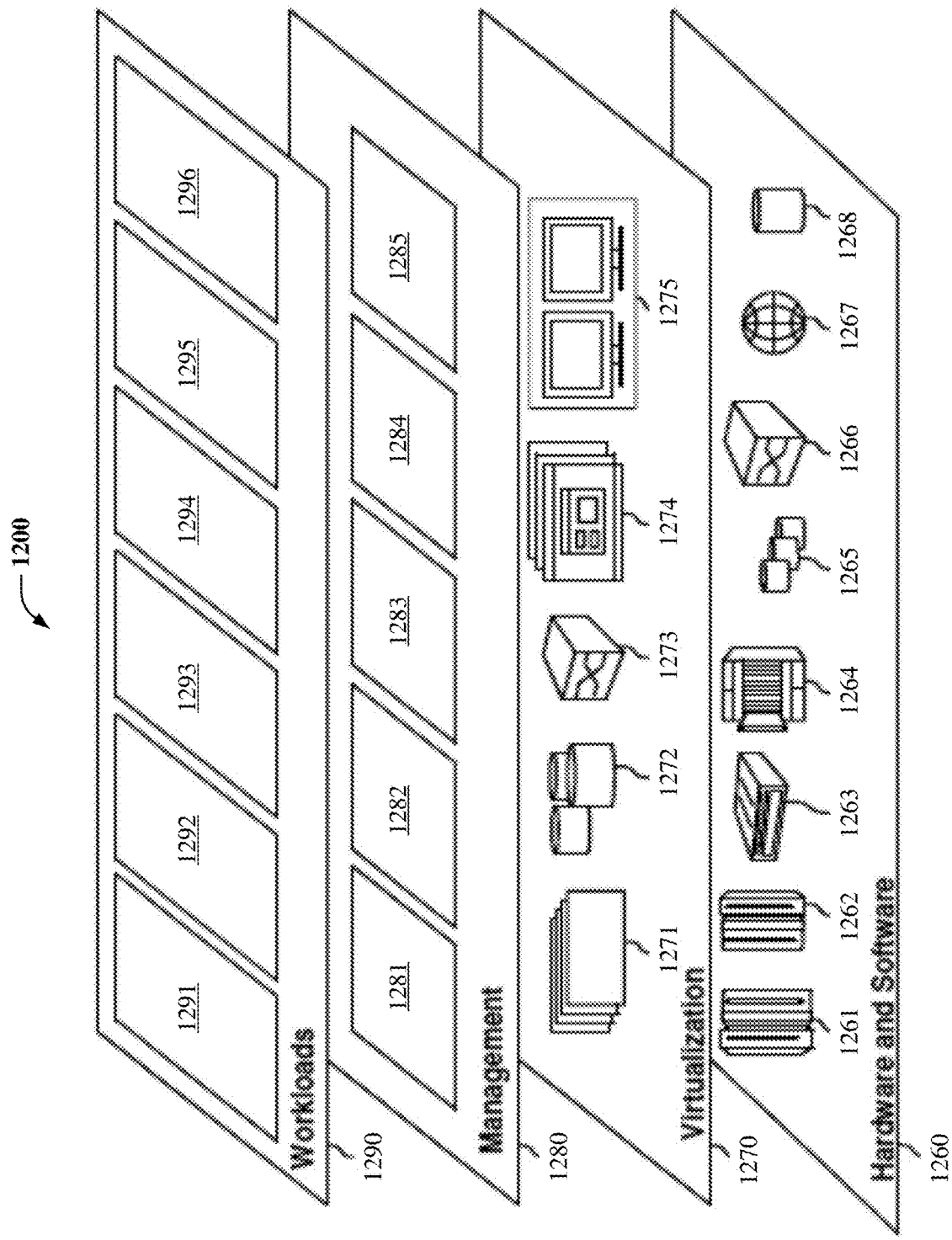
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and safe shell container software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components; and
 a processor that executes the computer executable components stored in the memory, wherein the computer executable components comprise:
  a container inspection control component that:
   defines one or more constrained capabilities of a container to perform a container inspection of a live runtime state of a virtual container executing one or more processes, wherein the one or more constrained capabilities limits the container inspection to read-only operations on the virtual container, wherein the container is separate from the virtual container, and the one or more constrained capabilities prevents the container inspection from accessing read privileged files in the virtual container, and
   executes the container to perform the container inspection of the live runtime state of the virtual container based on the one or more constrained capabilities; and
  a control level component that defines a level of control of the container based on one or more combinations of one or more control components selected from a first group consisting of access control components and resource constraint components.

2. The system of claim 1, wherein the container comprises an inspection instance comprising at least one of: a kernel construct; a security construct; or a containerization construct.

3. The system of claim 1, wherein the container inspection control component defines the one or more constrained capabilities based on one or more control components selected from a second group consisting of privilege separation, namespace, capability-based security, secure computing mode, netfilter, control groups, and Security-Enhanced Linux, thereby facilitating improved security associated with at least one of: the container; the virtual container; or one or more resources of a container-based virtualization environment.

4. The system of claim 1, wherein the container operates as a non-root user during the container inspection of the live runtime state of the virtual container.

5. The system of claim 1, wherein the container inspection inspects at least one of a memory state, a disk state, or a network state of the virtual container.

6. The system of claim 1, wherein the container is generated via execution of a Bourne-Again Shell command.

7. A computer-implemented method, comprising:
defining, by a system operatively coupled to a processor, one or more constrained capabilities of a container to perform a container inspection of a live runtime state of a virtual container executing one or more processes, wherein the one or more constrained capabilities limits the container inspection to read-only operations on the virtual container, wherein the container is separate from the virtual container, and the one or more constrained capabilities prevents the container inspection from accessing read privileged files in the virtual container;
executing, by the system, the container to perform the container inspection of the live runtime state of the virtual container based on the one or more constrained capabilities; and
defining, by the system, a level of control of the container based on one or more combinations of one or more control components selected from a first group consisting of access control components and resource constraint components.

8. The computer-implemented method of claim 7, wherein the defining comprises, defining, by the system, the one or more constrained capabilities based on one or more control components selected from a second group consisting of privilege separation, namespace, capability-based security, secure computing mode, netfilter, control groups, and Security-Enhanced Linux.

9. The computer-implemented method of claim 7, wherein the container inspection comprises inspecting at least one of a memory state, a disk state, or a network state of the virtual container.

10. The computer-implemented method of claim 7, wherein the container operates as a non-root user during the inspecting of the live runtime state of the virtual container.

11. The computer-implemented method of claim 7, wherein the container is generated via execution of a Bourne-Again Shell command.

12. A system, comprising:
a memory that stores computer executable components; and
a processor that executes the computer executable components stored in the memory, wherein the computer executable components comprise:
a container inspection control component that:
defines one or more resource constraints of a container to perform a container inspection of a live runtime state of a virtual container executing one or more processes, wherein the one or more resource constraints restricts an amount of usage of a resource of the system to a defined utilization during the container inspection, wherein the container is separate from the virtual container, and the one or more resource constraints prevents the container inspection from accessing read privileged files in the virtual container, and
executes the container to perform the container inspection of the live runtime state of the virtual container based on the one or more resource constraints; and
a control level component that defines a level of control of the container based on one or more combinations of one or more control components selected from a first group consisting of access control components and resource constraint components.

13. The system of claim 12, wherein the container operates as a non-root user during the inspection of the live runtime state of the virtual container based on one or more read-only actions.

14. The system of claim 12, wherein the container inspection control component defines the one or more resource constraints based on one or more control components selected from a second group consisting of control groups, and Security-Enhanced Linux.

15. The system of claim 12, wherein the container inspection control component prevents execution of one or more write operations by the container on the virtual container, thereby facilitating a safer inspection ability, without hampering the processing capacity associated with one or more resources of a container-based virtualization environment.

16. A computer program product facilitating a container inspection process, the computer program product comprising a computer readable storage medium having program instructions embodied therewith, the program instructions executable by a processor to cause the processor to:
define, by the processor, one or more resource constraint components of a container to perform a container inspection of a live runtime state of a virtual container executing one or more processes, wherein the one or more resource constraints restricts an amount of usage of a resource of the system to a defined utilization during the container inspection, wherein the container is separate from the virtual container, and the one or more resource constraints prevents the container inspection from accessing read privileged files in the virtual container;
execute, by the processor, the container to perform the container inspection of the live runtime state of the virtual container based on the one or more resource constraint components; and
define, by the processor, a level of control of the container based on one or more combinations of one or more control components selected from a first group consisting of access control components and resource constraint components.

17. The computer program product of claim 16, wherein the one or more resource constraint components are selected from a second group consisting of control groups and Security-Enhanced Linux, thereby facilitating improved processing capacity associated with one or more resources of a container-based virtualization environment.

18. The computer program product of claim 16, wherein the container operates as a non-root user during the inspection of the live runtime state of the virtual container based on one or more read-only actions.

19. A computer program product facilitating a container inspection process, the computer program product comprising a computer readable storage medium having program instructions embodied therewith, the program instructions executable by a processor to cause the processor to:
- define one or more constrained capabilities of a container to perform a container inspection of a live runtime state of a virtual container executing one or more processes, wherein the one or more constrained capabilities limits the container inspection to read-only operations on the virtual container, w herein the container is separate from the virtual container, and the one or more constrained capabilities prevents the container inspection from accessing read privileged files in the virtual container;
- execute the container to perform the container inspection on the virtual container based of the live runtime state of the one or more constrained capabilities; and
- define a level of control of the container based on one or more combinations of one or more control components selected from a first group consisting of access control components and resource constraint components.

20. The computer program product of claim 19, w herein the container comprises an inspection instance comprising at least one of: a kernel construct; a security construct; or a containerization construct.

21. The computer program product of claim 19, w herein the container inspection control component defines the one or more constrained capabilities based on one or more control components selected from a second group consisting of privilege separation, namespace, capability-based security, secure computing mode, netfilter, control groups, and Security-Enhanced Linux, thereby facilitating improved security associated with at least one of: the container; the virtual container; or one or more resources of a container-based virtualization environment.

22. The computer program product of claim 19, w herein the container operates as a non-root user during the container inspection of the live runtime state of the virtual container.

23. The computer program product of claim 19, w herein the container inspection inspects at least one of a memory state, a disk state, or a network state of the virtual container.

24. The computer program product of claim 19, w herein the container is generated via execution of a Bourne-Again Shell command.

25. The computer program product of claim 16, w herein the container comprises an inspection instance comprising at least one of: a kernel construct; a security construct; or a containerization construct.

* * * * *